Patented Nov. 21, 1944

2,363,464

UNITED STATES PATENT OFFICE 2,363,464

BETA-AMINOALKYL ACETALS

Murray Senkus, Terre Haute, Ind., assignor to Commercial Solvents Corporation, Terre Haute, Ind., a corporation of Maryland No Drawing. Application April 29, 1942, Serial No. 441,022

7 Claims. (Cl. 260—584)

My invention relates to new and useful amino acetals. More particularly, it is concerned with symmetrical beta-aminoalkyl acetals having the following general structural formula:

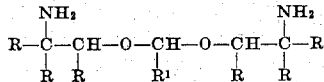

wherein R may represent hydrogen or alkyl, and $R^1$ may represent a member selected from the group consisting of hydrogen, alkyl, and aryl. Examples of the beta-aminoalkyl acetals included within the scope of my invention, are the bis(2-amino-2-methylpropoxy) methanes, and the bis-(2-aminobutoxy) methanes which have the following structural formulas:

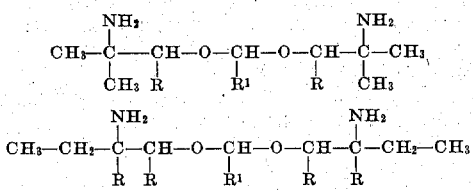

wherein R may represent hydrogen or alkyl, and $R^1$ may be either hydrogen, alkyl, or aryl.

The beta-aminoalkyl acetals of my invention are preferably prepared by the catalytic hydrogenation of the corresponding nitro compounds. According to this process, the desired nitro compound is subjected to hydrogenation at normal or elevated pressures in the presence of a hydrogenation catalyst, with or without an auxiliary solvent, such as methanol or an aqueous solution of carbon dioxide, at a temperature below 125° C. In general, any hydrogenation catalyst which possesses catalytic activity under the conditions employed, will be satisfactory. I prefer, however, to use a finely-divided Raney nickel catalyst. This catalyst is very active in hydrogenation processes of this type, and has an exceptionally long life.

The hydrogenation reaction in general may be effected at hydrogen pressures ranging from atmospheric pressure to pressures slightly below those which tend to cleave the acetal linkage. I have found it preferable, however, to carry out such reactions at pressures ranging from approximately 1000 to 1500 pounds per square inch, and at a temperature of from about 50 to 70° C., in the presence of thorough agitation. The rate of reaction is directly proportional to the temperatures and pressures utilized and, therefore, for a decrease in one of them, there should be a corresponding increase in the other. Lower temperatures and pressures will ordinarily require a longer reaction time and, conversely, higher pressures and temperatures will in general shorten the time for completion of the reaction. However, under the latter conditions excessive pressures and/or temperatures, even with a short reaction period, tend to result in lower yields of the desired amino compound. When carrying out the reaction in accordance with the preferred conditions described above, hydrogenation is in general found to be complete after a period of from two to four hours. Optimum conditions in regard to the temperature, pressure, and catalyst in any given instance, however, may be readily determined by simple experiment. Also, it is generally desirable to employ a suitable solvent such as methyl or ethyl alcohol.

When hydrogen is no longer absorbed and the reaction is complete, the catalyst is separated from the reaction mixture and the solvent solution fractionated, to yield the beta-aminoalkyl acetals. The products obtained in this manner are, in general, relatively pure. If it is desired to purify these materials further, however, they may be distilled under reduced pressure. In order to facilitate their separation from the reaction mixture, it is sometimes desirable to agitate the reaction mixture with a caustic solution, and extract the beta-aminoalkyl acetals with ether. Fractionation of the ether extract yields the beta-aminoalkyl acetals.

The dinitro acetals employed in the preparation of these compounds, may be produced in accordance with any suitable procedure. However, I prefer to prepare such compounds in accordance with the process described in my co-pending application, Serial No. 434,173, filed March 11, 1942. By this process, approximately equivalent amounts of the nitro alcohol and the desired aldehyde are refluxed in the presence of a small amount of an acid catalyst, such as hydrochloric acid, sulfuric acid, phosphoric acid, or para-toluenesulfonic acid and, if desired, in the presence of an organic liquid such as benzene or toluene, which is capable of removing the water produced during the reaction, in the form of a constant boiling mixture. I have found this reaction to be very general in character and may be effected between any aldehyde and nitro alcohol of the type herein disclosed. Suitable aldehydes, which may be employed in this reaction, are formaldehyde, isobutyraldehyde, benzaldehyde, heptaldehyde, acrylic aldehyde, and the like. As examples of nitro alcohols which may be utilized, there may be mentioned 2-nitro-2-methyl-1-propanol, 2-nitro-1-butanol, 3-nitro-3-methyl-2-butanol, 2-nitro-1-pentanol, 3-nitro-2-pentanol, and the like.

My invention may be further illustrated by the following specific examples:

Example I

One hundred and twenty parts of bis(2-nitro-2-methylpropoxy)methane, 80 parts of methyl alcohol, and 2 parts of Raney nickel catalyst were placed in a suitable hydrogenation apparatus and sealed. This solution was hydrogenated at a pressure of 1400 pounds per square inch at 60° C. for a period of two hours with constant agitation. After absorption of the hydrogen had ceased, the reaction mixture was withdrawn from the hydrogenation apparatus, the catalyst removed by filtration, and the filtrate fractionated. The bis(2-amino-2-methylpropoxy)methane, thus obtained, amounted to 88 parts, corresponding to a 96 per cent yield and was substantially free from impurities. The relatively colorless, odorless liquid obtained in this manner distilled at 72–74° C. at 2 mm. pressure.

Analysis: Calculated for $C_9H_{22}N_2O_2$: N, 14.74; neutral equivalent, 95. Found: N, 14.73; neutral equivalent, 96.

Example II 2-methyl-1,1-bis(2-amino-2-methylpropoxy)propane was prepared by dissolving 14 parts of 2-methyl-1,1-bis(2-nitro-2-methylpropoxy)propane in 80 parts of methyl alcohol and hydrogenating the mixture in the presence of 2 parts of Raney nickel catalyst for two hours at 60° C. under a pressure of 1500 pounds per square inch. The corresponding amino compound was obtained in 91 per cent yield and distilled at 92° C. at 2 mm. pressure.

Analysis: Calculated for $C_{12}H_{28}N_2O_2$: N, 12.07; neutral equivalent, 116. Found: N, 12.17; neutral equivalent, 116.

Example III

Eighteen parts of bis(2-nitro-2-methylpropoxy)phenylmethane, 120 parts of methyl alcohol and 5 parts of Raney nickel catalyst were placed in a hydrogenation apparatus and subjected to hydrogenation for four hours at a temperature of 70° C., according to the procedure of Example I. The resulting product, bis(2-amino-2-methylpropoxy)phenylmethane distilled at 121–122° C., at 2 mm. pressure, and was obtained in a yield of 90 per cent.

Analysis: Calculated for $C_{15}H_{26}N_2O_2$: N, 10.53; neutral equivalent, 133. Found: N, 10.74; neutral equivalent, 134.

Example IV

A solution of 45 parts of bis(2-nitro-1,2-dimethylpropoxy)methane and 230 parts of methyl alcohol was hydrogenated at 1100 pounds per square inch pressure for two hours at 30° C., and finally for thirty minutes at 60° C., in the presence of seven parts of Raney nickel catalyst. The corresponding amino compound, bis(2-amino-1,2-dimethylpropoxy)methane distilled at 90–92° C., at 2 mm. pressure, and was obtained in a yield of 86 per cent.

Analysis: Calculated for $C_{11}H_{26}N_2O_2$: N, 12.84; neutral equivalent, 109. Found: N, 13.07; neutral equivalent, 109.

Example V

A mixture consisting of 75 parts of bis(2-nitrobutoxy)methane, 150 parts of water, 100 parts of solid carbon dioxide and 10 parts of Raney nickel catalyst was hydrogenated for two hours at 70° C. and 1900 pounds per square inch, according to the process of Example I. The reaction solution was filtered and the filtrate agitated with 100 parts of a 44 per cent caustic solution. This alkaline mixture was then extracted with three 90-part portions of ether. Fractionation of the ether extract yielded 36 parts of bis(2-aminobutoxy)methane in the fraction distilling at 90° C. (2 mm.).

Analysis: Calculated for $C_9H_{22}N_2O_2$: N, 14.74; neutral equivalent, 95. Found: N, 14.41; neutral equivalent, 97.7.

The beta-aminoalkyl acetals of my invention are generally relatively colorless, odorless, high-boiling liquids. These products have been found to be useful in the synthesis of polyamides. They are likewise useful as intermediates in the preparation of numerous other organic compounds. Other uses for these products will readily occur to those skilled in the art.

My invention now having been described, what I claim is:

1. Symmetrical beta-aminoalkyl acetals having the structural formula:

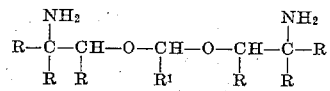

wherein R represents a member selected from the group consisting of hydrogen and alkyl, and $R^1$ represents a member selected from the group consisting of hydrogen, alkyl, and aryl.

2. Bis(2-amino-2-methylpropoxy)methane.

3. Bis(2-aminobutoxy)methane.

4. 2-methyl-1,1-bis(2-amino-2-methylpropoxy)propane.

5. In a process for the direct catalytic hydrogenation of a beta-nitroalkyl acetal to the corresponding beta-aminoalkyl acetal, the step which comprises subjecting a beta-nitroalkyl acetal to hydrogenation in the liquid phase in the presence of a hydrogenation catalyst at a temperature below 125° C. and under pressure of from about 1000 to 2000 pounds.

6. In a process for the direct catalytic hydrogenation of a beta-nitroalkyl acetal to the corresponding beta-aminoalkyl acetal, the step which comprises subjecting a beta-nitroalkyl acetal to hydrogenation in the liquid phase in the presence of a hydrogenation catalyst at elevated temperatures and pressures.

7. In a process for the direct catalytic hydrogenation of a beta-nitro-alkyl acetal having nitrogen and hydrogen attached to the same carbon atom to the corresponding beta-aminoalkyl acetal, the step which comprises subjecting a beta-nitro-alkyl acetal to hydrogenation in the presence of a hydrogenation catalyst and an aqueous solution of carbon dioxide at elevated temperatures and pressures.

MURRAY SENKUS.